March 8, 1938.  F. ENGRAO  2,110,762

DISPENSING AND MEASURING DEVICE

Filed Dec. 23, 1936

INVENTOR.
FILIPPO ENGRAO

BY *James M. Abbott*
ATTORNEYS.

Patented Mar. 8, 1938

2,110,762

UNITED STATES PATENT OFFICE 2,110,762

DISPENSING AND MEASURING DEVICE

Filippo Engrao, Los Angeles, Calif.

Application December 23, 1936, Serial No. 117,353

4 Claims. (Cl. 221—117)

This invention relates to improvement in liquid measuring and dispensing devices for measuring liquids in predetermined quantities, and it is especially adapted for use in bar rooms and the like for measuring syrups, cordials, bitters, liquors and like fluids.

In mixing of beverages which are comprised of several ingredients it is important that the component parts of the combination shall always be combined in the same ratio, or as nearly to the same ratio as possible, in order to maintain the same flavor each time the beverage is mixed. In present method of mixing beverages the ingredients are measured in measuring cups or glasses which due to imperfections are not usually of equal capacity or if the operator is in haste are not filled evenly at all times, and furthermore a portion of the fluid may be spilled in pouring, thus destroying the measured ratio of the ingredients.

The present invention contemplates the provision of a liquid measuring and dispensing device which will eliminate the inaccuracies of measurement of the present methods of beverage mixing and will easily and readily dispense the exact predetermined amount of liquid desired, and which furthermore will insure that the ingredients may be constantly displayed in their original packages and may be maintained sealed and in a sanitary condition thus, preserving the original flavor, preventing evaporation and contamination.

The invention is illustrated by way of example in the accompanying drawing, in which.

Figure 1:
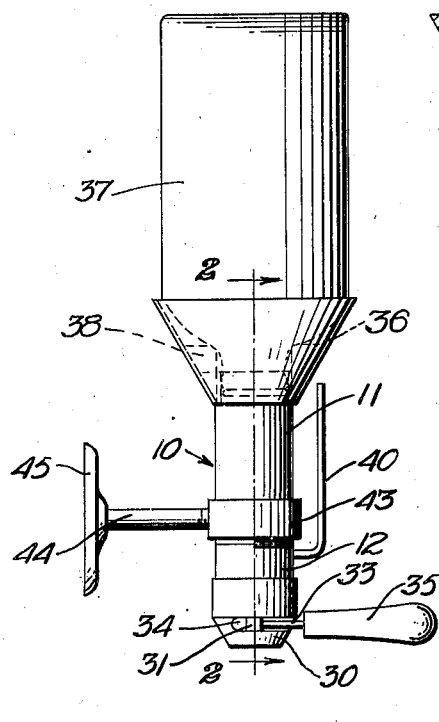
Figure 1 is a view in side elevation showing the preferred form of my device.
Figure 2:
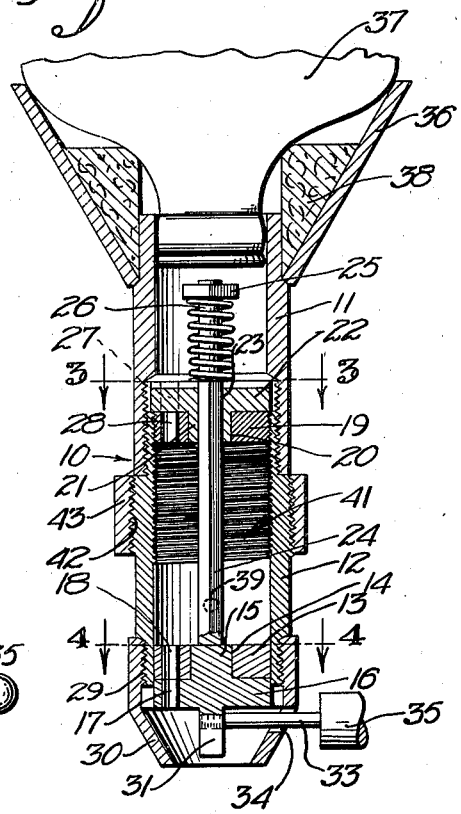
Fig. 2 is a view in longitudinal section through the device as indicated on line 2—2 of Fig. 1.
Figure 3:
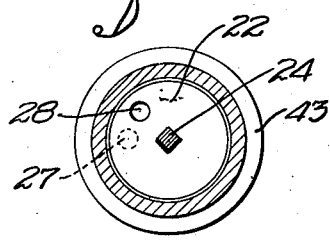
Fig. 3 is a view in cross section as indicated on line 3—3 of Fig. 2 showing the upper one of the valves of the device in a closed position.
Figure 4:
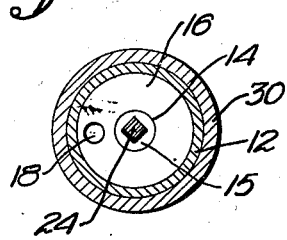
Fig. 4 is a view in cross section as indicated on line 4—4 of Fig. 2 showing the lower one of the valves of the device in an opened position.

Referring more particularly to the drawing, 10 indicates a measuring chamber which comprises a pair of tubular sleeves 11 and 12 which are threaded together to form an elongated cylinder. The lower end of sleeve 12 is closed as indicated at 13 with a fixed or removable end disc which has a central bore 14 into which fits a relieved portion 15 of the lower valve 16. The valve 16 has formed therethrough a port 17 which coincides with a port 18 through the end portion 13 of the sleeve 12. The upper end of the sleeve 12 is internally threaded to receive a threaded plug 19. The plug has a central bore 20 to receive an elongated relieved portion 21 of the upper valve 22. The valve 22 is formed with a square central bore 23 through which a squared valve stem 24 of the lower valve 16 extends. The internal end of the valve stem 24 is threaded to receive a nut 25, which holds a spring 26 in position on the valve stem 24 and against the upper side of the valve 22. The tension of spring 26 against the valve 22 and the nut 25 of the valve stem 24 will tend to hold the valves firmly upon their seats which are the upper faces of the closed portion 13 of the tubular sleeve 12 and the upper face of the plug 19. The valve 22 has a port formed therethrough indicated at 27, and which may be brought into alignment with a port 28 through the adjustable plug 19. On the lower end of the tubular sleeve 12 is a series of threads 29 which receive a threaded portion of a cap or nozzle 30. This cap is frusto-conical in shape and encloses the lower end of sleeve 12 and encases the open face of valve 16. Valve 16 is formed with a lug 31 on its lower face which has a threaded opening 32 to receive a rod 33. The rod projects outwardly through a slotted opening 34 in the wall of cap 30 and receives a handle 35. At the upper end of the tubular sleeve 11 is mounted a conical bottle receiving member 36 which receives the neck end of a bottle 37. Around the inside of the small portion of the conical bottle receiving member 36 is a ring shaped frusto-conical gasket or pad 38 composed of cork or like material through which the neck of the bottle projects and against which the enlarged portion of the bottle neck rests to hold the bottle in a firm and steady inverted position. A bore 39 is formed through the wall of the sleeve 12 which receives a vent pipe 40 which will release all air which might accumulate in the measuring chamber 41 which is formed between the valve 16 and the adjustable plug 19. External threads 42 are formed on the sleeve 12 to receive a threaded ring 43, which in turn accommodates a bracket rod 44 having a bracket plate 45 which may be fastened to the bar, wall, shell or the like to hold the device in an upright and operable position.

In operation of the present device the bottle 37 containing syrup, cordial, bitters, liquors or like fluids is inverted after being opened and inserted into the conical bottle receiving member 36. This allows the neck of the bottle to project through the central opening of the frusto-conical cork ring. This will permit the fluid to fill the space above the valve 22. At this time the small bore 27 of the upper valve 22 will be in aligned position with the small bore 28 of the adjustable plug 19, allowing the liquid to fill the measuring chamber 41 and the lower valve ports 17 and 18 will be closed. Any air which might have accumulated in the chamber 41 will be forced out through the vent hole 39 of the wall 12 of the measuring chamber and will escape through the vent pipe 40 connected therewith.

This will allow the measuring chamber 41 to be completely filled with fluid and will assure that the chamber will be completely filled at each successive time with an equal amount of fluid. The vent pipe 40 will also prevent a liquid seal within the chamber 41 when the lower valve is opened. At the time the foregoing operation is being completed the bore 18 in the end of the tubular sleeve 12 will not be in an aligned position with the bore 17 of the valve member 16, thereby sealing the lower opening to the measuring chamber 41 while the chamber is being filled. When the operator desires to withdraw a measured quantity of liquid from the device he will rotate the handle 35 counter-clockwise to the longitudinal axis of the device, thus rotating the valve 16 aligning the bore 17 and 18 allowing a predetermined quantity of liquid to be released from the device. When the handle 35 is moved to rotate valve 16 to align the ports 17 and 18 the square valve stem 24 will in turn rotate causing a movement of the valve 22 through which it passes. This will cause the valve 22 to rotate to seal the port 28 through the adjustable plug 19 which makes it impossible for additional liquid to gain access to the measuring chamber while the lower valve is in an opened position. When the handle 35 is returned to its original position, closing the valve opening 17 and 18 the reversed action will take place and valve 22 will be rotated to align ports 27 and 28 allowing the measuring chamber 41 to again be refilled. If at various times it is desirable for the device to vary the amount of dispensed fluid the tubular sleeves 11 and 12 may be unthreaded to allow access to the adjustable plug 19 which may be rotated and moved along the internally threaded portion of the sleeve 12. This action enlarges or diminishes the capacity of the measuring chamber. By tightening or loosening the nut 25 upon the valve stem 24 the valve may be accordingly adjusted. The tension on spring 26 may be varied to keep the valve members 16 and 22 firmly upon their valve seats 13 and 19.

It will thus be seen that with the structure here disclosed it is possible to dispense accurately measured quantities of liquid uniform in amount from a bulk supply, and that the bottle after it has been originally placed in communication with the device will be kept free from contamination due to the fact that the open end of the bottle is always enclosed in the bottle receiving member, and the cork gasket therein completely surrounds the mouth of the bottle. It will also be readily seen that the amount of fluid dispensed may be varied selectively from time to time due to the adjusting feature of the adjustable plug with relation to the measuring chamber and the upper valve member.

While I have shown the preferred form of my invention, as now known to me, it will be understood that various changes might be made in the combination, construction and arrangement of parts by those skilled in the art without departing from the spirit of the invention as claimed.

Having thus described my invention, what I claim and desire to secure by Letters Patent is:—

1. A device of the character described comprising a receiving member for a bottle or the like, a tubular sleeve in combination therewith, a pair of valves interposed within said sleeve to form a chamber therebetween, means connecting said valve members whereby said valves may be rotated in unison, a pair of valve seats interposed within said sleeve and upon which said valve members seat, one of said valve seats being threaded to allow the capacity of the chamber between the valves to be regulated and means connected with one of said valve members, which when operated, will alternately open and close said valves.

2. In a device of the character described having a fluid receiving means, a tubular sleeve connected therewith being internally threaded to receive an adjustable plug, said adjustable plug having a central opening therethrough to receive a relieved portion of an upper valve member, the lower end of said sleeve being closed and having a central bore therethrough to receive a relieved portion of a lower valve member, said closed portion of the tubular sleeve and the adjustable plug within said sleeve forming a chamber therebetween, said lower valve having a square valve stem extending longitudinally of the tubular sleeve and passing through a squared hole through the upper one of said valves, a bore through each of said valves and a bore through the adjustable plug and the closed portion of said tubular sleeve, and means whereby the lower bore valve may be rotated simultaneously causing the bore of the upper valve member and the adjustable plug to be in alignment to allow fluid from the fluid receiving means to enter the chamber between the adjustable plug and the closed end of the sleeve, while at the same time moving the bore of the lower valve out of alignment with the bore through the closed end of the tubular sleeve.

3. A device of the character described comprising a tubular sleeve, said tubular sleeve carrying a pair of valve seats, a chamber formed therebetween, means whereby the valve seats may be adjusted in spaced relation to each other, valve members for said valve seats and valve connecting means intermediate the valve members whereby the valve members will operate in unison and alternately open and close, means whereby liquid is delivered to the one end of the tubular sleeve and may be dispensed from the opposite end thereof, the amount of liquid dispensed depending upon the spaced position of the valve seats with relation to each other.

4. A device of the character described comprising a tubular sleeve, said tubular sleeve carrying a pair of valve seats, a chamber formed therebetween, means whereby the valve seats may be adjusted in spaced relation to each other, valve members for said valve seats and valve connecting means intermediate the valve members whereby the valve members will operate in unison and alternately open and close, means whereby liquid is delivered to the one end of the tubular sleeve and may be dispensed from the opposite end thereof, the amount of liquid dispensed depending upon the spaced position of the valve seats with relation to each other, and means whereby the valve members will be yieldably held upon their seats irrespective of the adjusted position of the valve seats with relation to each other.

FILIPPO ENGRAO.